(12) United States Patent
Lu

(10) Patent No.: US 11,239,692 B2
(45) Date of Patent: Feb. 1, 2022

(54) AUTOMATIC TRANSFER SWITCH UTILIZING BACK-TO-BACK MOUNTED MOLDED CASE CIRCUIT BREAKERS OR MOLDED CASE SWITCHES TO CONNECT A LOAD TO A NORMAL POWER SOURCE AND A STANDBY POWER SOURCE

(71) Applicant: Wen-Feng Lu, Kaohsiung (TW)

(72) Inventor: Wen-Feng Lu, Kaohsiung (TW)

(73) Assignee: Wen-Feng Lu, Kaohsiung (TW)

( * ) Notice: Subject to any disclaimer, the term of this patent is extended or adjusted under 35 U.S.C. 154(b) by 137 days.

(21) Appl. No.: 16/044,521

(22) Filed: Jul. 25, 2018

(65) Prior Publication Data

US 2020/0036222 A1 Jan. 30, 2020

(51) Int. Cl.
| | |
|---|---|
| *H01H 19/00* | (2006.01) |
| *H02J 9/06* | (2006.01) |
| *H01H 3/26* | (2006.01) |
| *H01H 3/00* | (2006.01) |
| *H02J 9/04* | (2006.01) |

(52) U.S. Cl.
CPC .............. *H02J 9/066* (2013.01); *H01H 3/00* (2013.01); *H01H 3/26* (2013.01); *H01H 19/00* (2013.01); *H02J 9/04* (2013.01); *H01H 2003/266* (2013.01); *H01H 2300/018* (2013.01); *H02J 9/068* (2020.01)

(58) Field of Classification Search
CPC .............. H01H 3/00; H01H 19/00; H02J 9/04
USPC .......................................................... 307/64
See application file for complete search history.

(56) References Cited

U.S. PATENT DOCUMENTS

| | | | |
|---|---|---|---|
| 4,398,097 A | | 8/1983 | Schell et al. |
| 4,524,339 A | * | 6/1985 | Chabot ................ H01H 1/5833 335/171 |
| 6,015,959 A | * | 1/2000 | Slepian ................ H01H 3/3015 200/400 |
| 8,431,846 B2 | | 4/2013 | Lyu |
| 8,471,659 B1 | | 6/2013 | Flegel |
| 9,070,519 B2 | | 6/2015 | Marushima et al. |
| 9,754,736 B2 | | 9/2017 | Wang et al. |

(Continued)

FOREIGN PATENT DOCUMENTS

EP  0 613 059 B1  10/1997

OTHER PUBLICATIONS

Transfer switch 101 White Paper WP140001EN, Eaton Corporation, Cleveland, OH, U.S.A. 2015 p. 4.

*Primary Examiner* — Adi Amrany

(57) ABSTRACT

An automatic transfer switch (ATS) utilizing molded case circuit breakers (MCCB) or molded case switches (MCS) to connect and disconnect an electrical load to a Normal power source and a Standby power source. The ATS comprising two MCCB or MCS mounted back-to-back one connected to a Normal power source and the other to a Standby power source. Bus bars electrically connect the poles on the load side of the MCCB or MCS connecting the ATS to a load. A rotating cam drive mechanism drives Toggle Levers with attached stored energy opening springs toggles to open and close the MCCB or MCS through the leverage of fulcrum points. A ratchet mounted on the output shaft of a unidirectional gear motor rotates the cam drive mechanism. An interlock bar prevents both MCCB from closing at the same time.

1 Claim, 15 Drawing Sheets

(56) References Cited

U.S. PATENT DOCUMENTS

2007/0008054 A1\* 1/2007 Marks .................. H01H 71/525
　　　　　　　　　　　　　　　　　　　　　　　335/172

\* cited by examiner

AUTOMATIC TRANSFER SWITCH UTILIZING BACK-TO-BACK MOUNTED MOLDED CASE CIRCUIT BREAKERS OR MOLDED CASE SWITCHES TO CONNECT A LOAD TO A NORMAL POWER SOURCE AND A STANDBY POWER SOURCE

BACKGROUND OF THE INVENTION

1. Field of the Invention

An automatic transfer switch utilizing molded case circuit breakers (MCCB) or molded case switches (MCS) mounted back-to-back which are operated by a rotating cam mechanism driving Toggle Levers with attached stored energy opening springs to open and close each MCCB or MCS to connect and disconnect an electrical load to a Normal power source and a Standby power source.

2. Description of the Related Art

Automatic Transfer Switches (ATS) are divided generally into those designs using Contactor type switches and those designs using Molded Case Switches (MCS) or Molded Case Circuit Breakers (MCCB). MCCB have overload current and short circuit trip protection whereas MCS are without overload current protection or short circuit trip protection.

In ATS designs using MCCB or MCS the two switches can be opened and closed independently of the position of the other switch. Because of this a mechanical interlock device is required in these designs to prevent the contacts of the MCCB or MCS from being closed at the same time, connecting both power sources at the same time and causing serious damage to equipment.

In the existing technology of ATS using MCCB or MCS these switches are mounted side-by-side and sometimes vertically. Side-by-side mounting is the most common method in existing art and is shown in FIGS. 1A and 1B of the drawings as an example of the existing art. The toggling and interlock of this ATS using either MCCB or MCS are the same so we refer only to MCCB in this description of the related art to avoid unnecessary repetition of terms. The description applies to ATS using MCS as well.

FIGS. 1A and 1B show an example of an ATS 1 of the existing art. Two MCCBs 13 and 14 are mounted side-by-side to connect to a Normal Power source 21 and a Standby power source 22 respectively. A bi-directional motor shaft 11 rotates a toggle lever 12 to toggle the MCCBs open and closed.

Bus bars 15 and 16 connect each pole on the load sides of the two MCCB, which are shown here in a 2-pole MCCB. Electrical connection of poles on the load side of the MCCBs is required in ATS and would be the same for three-pole or four-pole MCCB.

With reference to FIG. 2 in the drawings, a mechanical interlock device is shown for ATS 1 to prevent both switches from closing at the same time is shown as an elongated member with a fulcrum that pushes plungers whereby when one plunger is up preventing an MCCB from closing, the other plunger is down allowing that MCCB to close.

Another example of the existing art of an Automatic Transfer Switch using Molded Case Switches is disclosed in Schell U.S. Pat. No. 4,398,097 (1983) shows an automatic transfer switch with two molded case switches mounted vertically.

The Schell U.S. Pat. No. 4,398,097 (1983) design also uses an elongated member on a fulcrum with plungers as an auxiliary interlock mechanism to prevent both switches from closing at the same time. This design further uses vertically stacked fixed bus bars to connect each pole of the load side of the Molded Case Switches. These bus bars in this arrangement are also very long.

Generally speaking, in the prior art ATS using MCCB or MCS mounted side-by-side or vertically mounted require a complex interlock mechanism to prevent both switches from closing at the same time. These designs also require longer bus bars to connect the load sides of the switches, which increase weight and material cost.

SUMMARY OF THE INVENTION

An automatic transfer switch (ATS) using MCCB or MCS mounted back-to-back to connect and disconnect an electrical load to a Normal power source and a Standby power source.

When MCCB are used the ATS will have over current and short circuit trip protection. When MCS are used the ATS is without overload protection or short circuit trip protection. Because the structure and dimensions of the MCCB and MCS used are the same, mount in their respective bases in the same way, and are toggled on and off by the same mechanisms both MCCB and MCS are referred to as simply MCCB in this Summary to avoid unnecessary repetition of terms describing the same structures or operations.

In the preferred embodiment a controller is integrated with the transfer switch to monitor normal and standby power supply and initiate automatic transfer. The controller also provides a power supply to a gear motor for automatic transfer operation.

Each MCCB is mounted on a base. These MCCB bases are connected to a Mounting Base Plate in a back-to-back configuration with the toggles of each MCCB facing outward.

Lug connections are provided at the top of each MCCB to connect to Normal and the Standby power sources to the ATS respectively.

The poles on the load side of the two MCCB are electrically connected by horizontally-mounted bus bars for 2-pole, 3-pole, or 4-pole MCCB. Three-pole MCCB are shown in the drawings for this embodiment but will be the same for models with 2-pole and 4-pole MCCB as well. Lug connections on the bus bars connect the ATS to a load.

Rectangular-shaped Toggle Levers extend around each MCCB to transmit force from a rotating cam drive mechanism to toggle closed the MCCBs with leverage from fulcrum points located on the sides of each respective MCCB mounting base.

Each Toggle Lever has a rear crossbar located at the back of the MCCB with a roller follower extending to the surface of one of two cams in a cam drive mechanism.

A pair of stored energy opening springs connect each side of the rear crossbar on each toggle lever to the bottom of the mounting base for each MCCB. These stored energy opening springs expand in an energy storing process when rotation of the cam drive mechanism raises the roller follower on the rear crossbar of a Toggle Lever to close its respective MCCB through the leverage of the fulcrum points.

When the cam drive mechanism rotates from a switch closed position the roller follower on the Toggle Lever drops sharply to the lower surface of its associated cam and the closing force to the Toggle Lever is removed. With the closing force to the toggle lever removed the stored energy of the opening springs is released pulling open the switch through leverage of the fulcrum points.

The cam drive mechanism consists of two snail/drop cams. The surface of each cam is in contact with a roller follower on a rear crossbar of a toggle lever. The snail/drops cams are identical in shape and have a lower surface that extends to a peak surface before dropping sharply back to the lower surface when rotated in a clockwise direction.

The two snail/drop cams in the cam drive mechanism are installed coaxially but opposite in orientation with the peak surfaces of the cams 180 degrees out of phase. This orientation of the peak surfaces of the two snail/drop cams prevents both MCCB from receiving a closing input from the cam drive mechanism at the same time as the cam drive mechanism cycles through a fixed transfer sequence. This orientation of the cams also provides a both switches disconnected positions between the Normal power source connected and the Standby power source connected positions.

Rotation of the cam drive mechanism drives the toggle levers to cycle the two MCCB in a fixed sequence of a both switches open position, a Normal power MCCB closed position, a both switches open position, and a Standby power MCCB closed position. Further rotation of the cam drive will repeat this fixed sequence.

A unidirectional gear motor connects to a one-way ratchet to rotate the cam drive mechanism. The direction of the gear teeth in the ratchet enables transmission of torque from the motor shaft to the cam drive mechanism in one direction. The arrangement of the gear teeth in the one-way ratchet will declutch from the cam drive mechanism from the motor shaft when the cam drive mechanism is rotated by a manual transfer handle preventing manual operation from rotating the shaft of the gear motor.

A manual transfer handle rotates the cam drive mechanism in the clockwise direction to cycle the switch through the fixed transfer sequence.

A locking device can latch the transfer switch in any of the four positions in the transfer sequence. When the locking device is pushed in and held in place it mechanically prevents the manual transfer handle from rotating the cam drive mechanism. There is a spring mechanism in the locking device that compresses when locking device is pushed in. A padlock hole is provided on the locking device to lock it in place.

When the locking device is pushed in a micro switch opens signaling the controller to disconnect the power supply to the gear motor preventing electric operation of the cam drive mechanism by the motor shaft. The locked signal from the micro switch also disables any pushbutton inputs on the controller.

A mechanical interlock bar made of a non-conductive material inserts into an opening in the back of each MCCB and is operated by mechanical elements associated with the electrical contacts in each MCCB to prevent both MCCB from closing at the same time.

Constant monitoring of Normal and Standby Power and Automatic operation of the ATS through the fixed transfer sequence is carried out by a Controller. The controller has a display screen for displaying messages and the position of each MCCB. The controller also provides an electrical power supply to the gear motor.

Two pairs of MCCB position micro switches are installed on the controller to provide the position information of each MCCB. One of the micro switches in each pair provides MCCB position information to the controller. The other micro switch in each pair provides an auxiliary output of MCCB position for use by an external device. The rear crossbar of each Toggle Lever compresses microswitches on its respective MCCB when closed by a Toggle Lever.

DETAILED DESCRIPTION OF CURRENT INVENTION

Figure 1A:
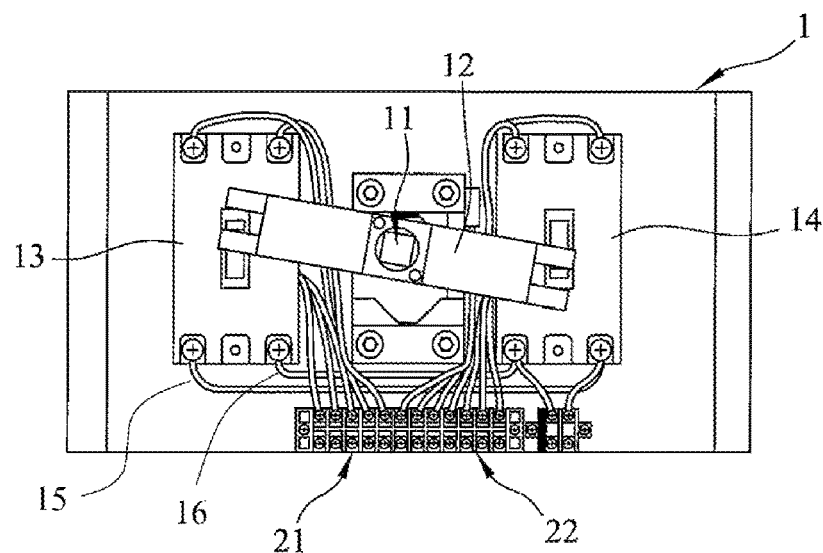
FIGS. 1A & 1B front views illustrating an automatic transfer switch of the prior art.
Figure 1B:
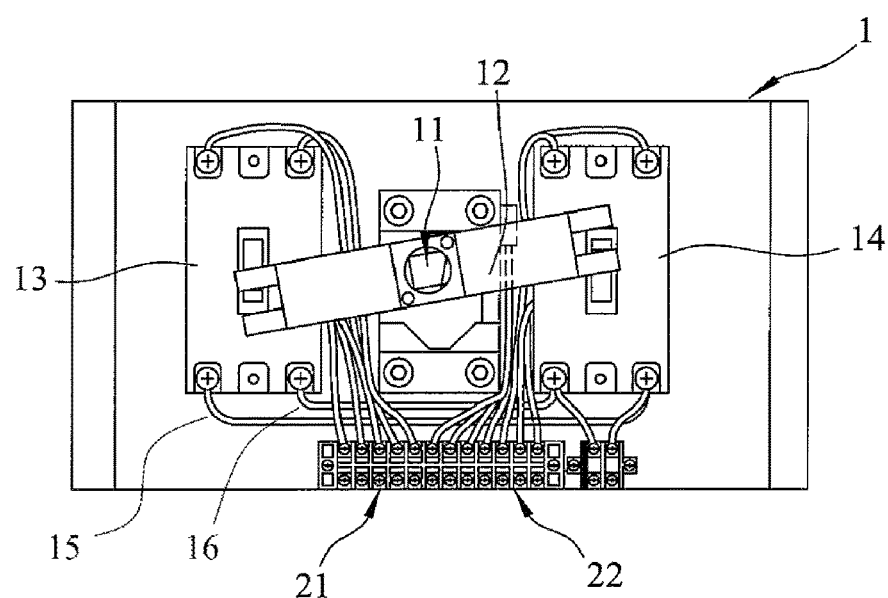
Figure 2:
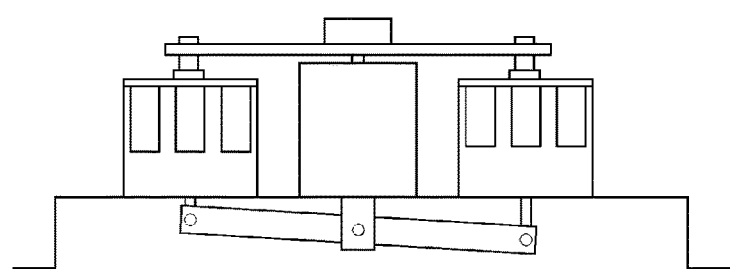
FIG. 2 an example of an interlock mechanism of the prior art
Figure 3:
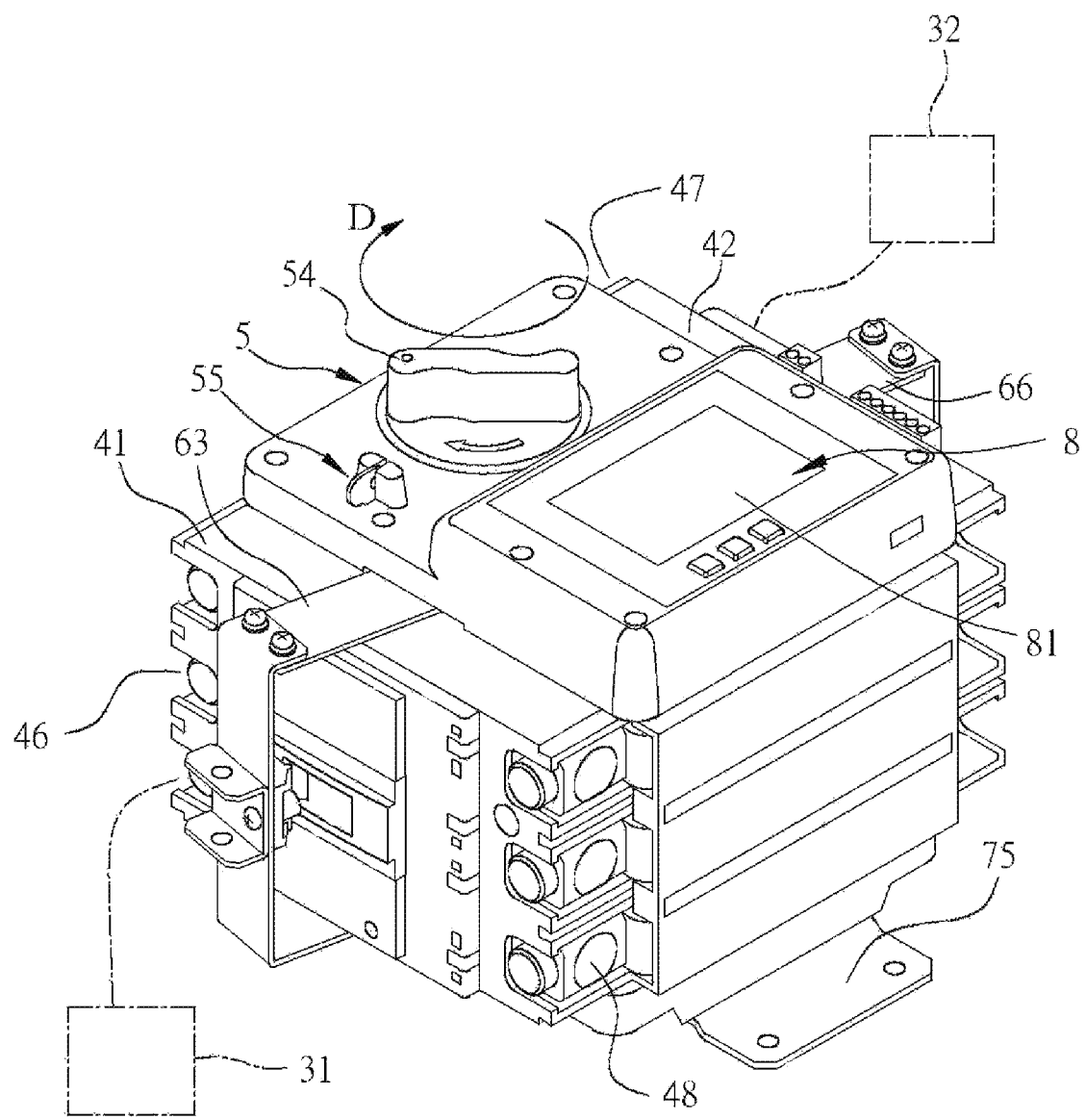
FIG. 3 is a perspective view illustrating an embodiment of the present invention using 3-pole MCCB.

Referring to FIG. 3 the present invention is an automatic transfer switch (ATS) with two MCCB or MCS mounted back-to-back for connecting a load to a Normal power source 31 and Standby power source 32.

MCCB provide over current and short circuit trip protection. MCS are without overload protection or short circuit trip protection. Because the structure of the MCCB and MCS used in this embodiment have the same shape and dimensions, are toggled in exactly the same way, and use the same interlock device, this description and drawings will refer to both MCCB and MCS as "MCCB" to avoid unnecessary repetition of these terms for the same operation and structures.

Continuing to refer to FIG. 3, a Controller 8 is integrated with the ATS in this embodiment to monitor Normal power source 31 and Standby power source 32 and execute automatic transfer of power when Normal power fails and retransfer to the Normal power source when it is restored. Controller 8 has a Controller Display screen 81 for displaying position of each MCCB and the status of each power source. The ATS has a Front Cover 5 which also covers the Controller Display Screen 81.

Structure

Figure 6A:
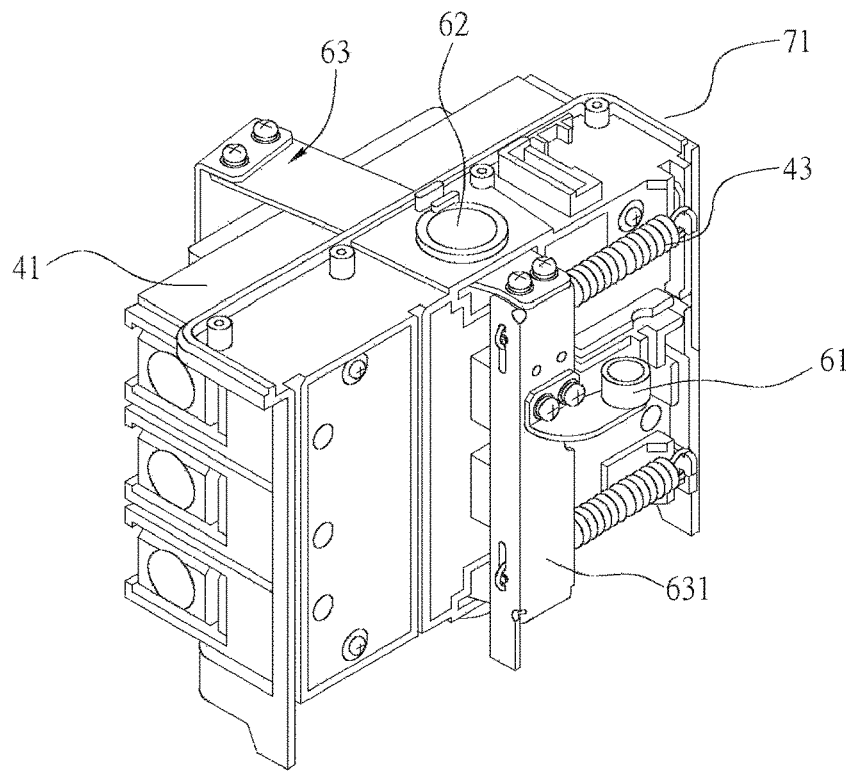
Figure 6B:
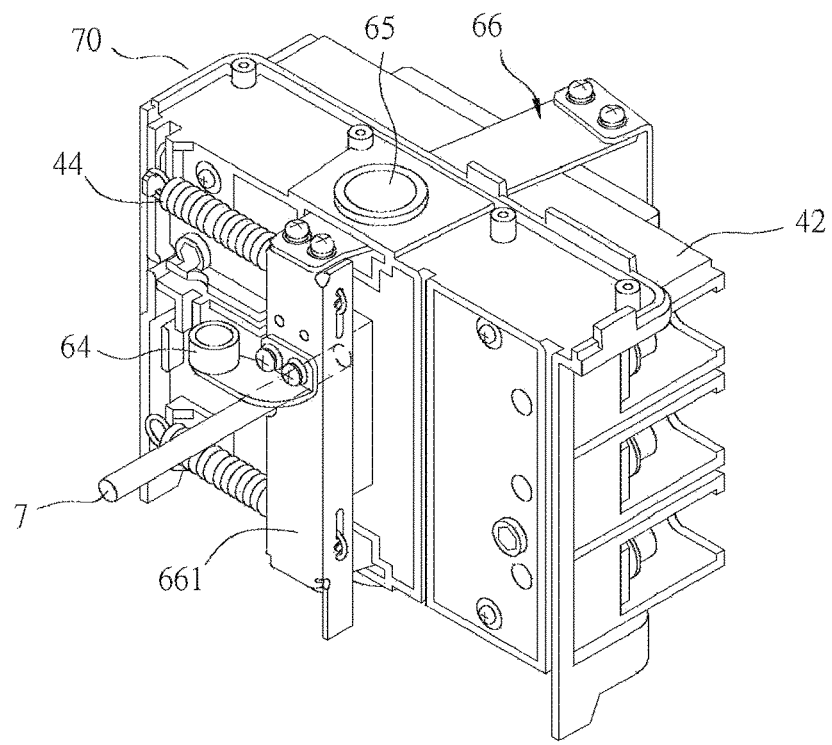

Referring to FIG. 3 and FIGS. 6A & 6B, MCCB 1 41 and MCCB 2 42 are mounted in separate Bases 70, 71 respectively. These Bases for each MCCB attach to a Mounting Plate 75 in a back-to-back orientation with the toggles of both MCCB facing outward.

Figure 4:
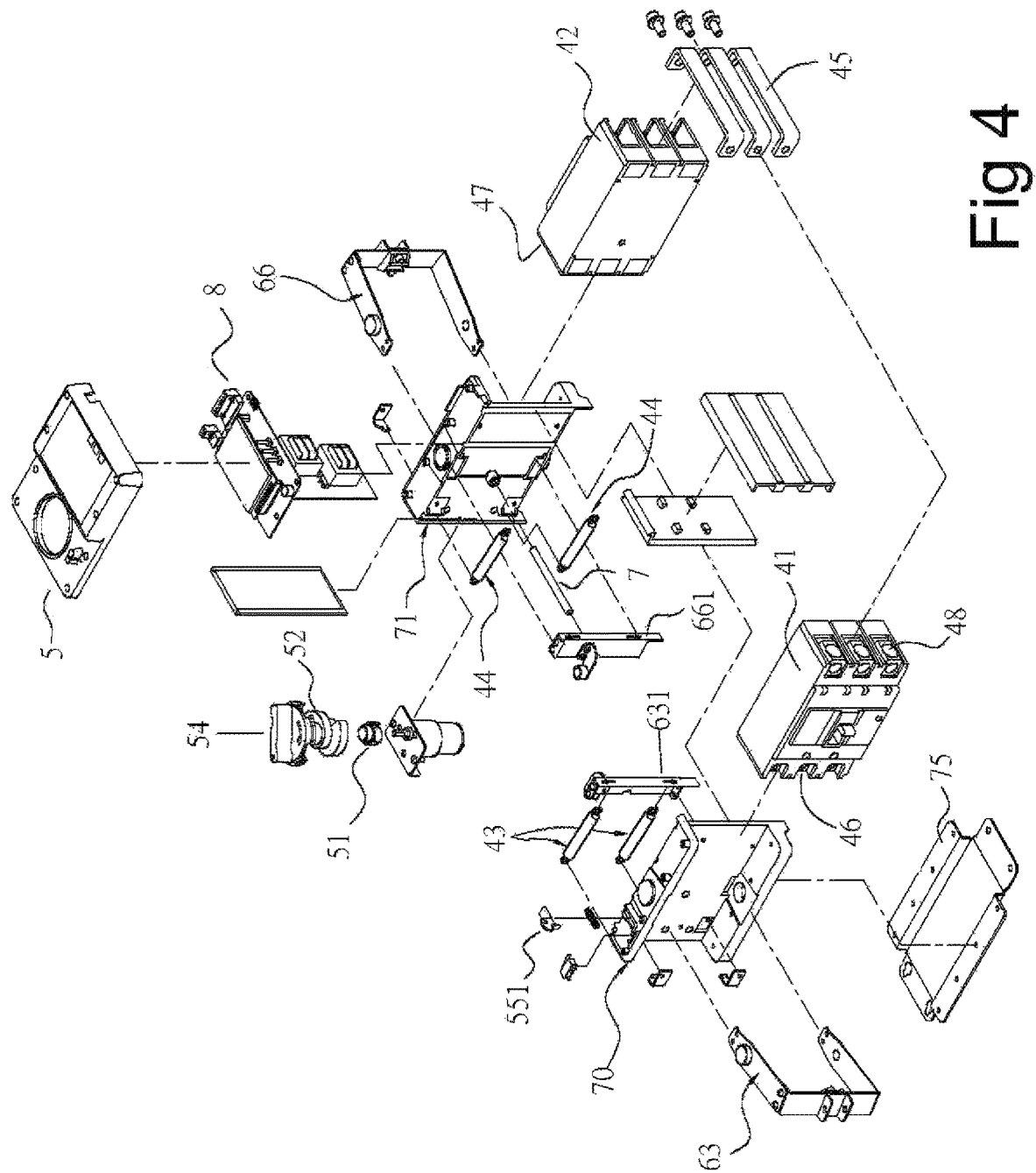
FIG. 4 is a three-dimensional, exploded view of the current invention.

Referring to FIGS. 3 & 4, Lugs 46 at the top of MCCB 1 41 are for connecting the ATS to a Normal Power source 31. Lugs 47 at the top of MCCB 2 42 are for connecting to a Standby power source 32.

The poles on the load sides of MCCB 1 41 and MCCB 2 42 are electrically connected by horizontally-mounted Bus Bars 45 with 2-pole, 3-pole, or 4-pole models of MCCB. Three-pole MCCB are shown in the drawings FIGS. 3 & 4. Lugs 48 on the bus bars are to connect the ATS to a load.

With Reference to FIG. 4 and FIGS. 6A & 6B, rectangular-shaped Toggle Levers 63, 66 extend around MCCB 1 41 and MCCB 2 42 to contact the toggle on the front of each MCCB. Roller followers 61, 64 on Rear Crossbars 631, 632 on the Toggle Levers 63, 66 extend to make contact with a Cam Drive Mechanism 52. Toggle Levers 63, 66 transmit the closing force of Cam Drive Mechanism 52 through the leverage of Fulcrum Points 62, 65 located on the sides of MCCB Bases 70, 71 respectively. Toggle levers 63, 66 differ only in location of roller follower on the rear crossbar and are identical in function.

With reference to FIG. 6A, Toggle Lever 1 63 for MCCB 1 41 consists of a Rear Crossbar 631 with attached Roller Follower 61, a set of Stored Energy Opening Springs 43, a set of Fulcrum points 62 on each side of the its MCCB Base 70, and the Toggle Lever 63 contacting the toggle of MCCB 1 41.

With reference to FIG. 6B, MCCB 2 42 is shown. The same type of structures used to toggle MCCB 1 41 are used to toggle MCCB 2 42 and are arranged in a mirror image of the cam driven structures from MCCB 1 41. Mechanical Interlock Device 7 is also shown in FIG. 6B.

Figure 5:
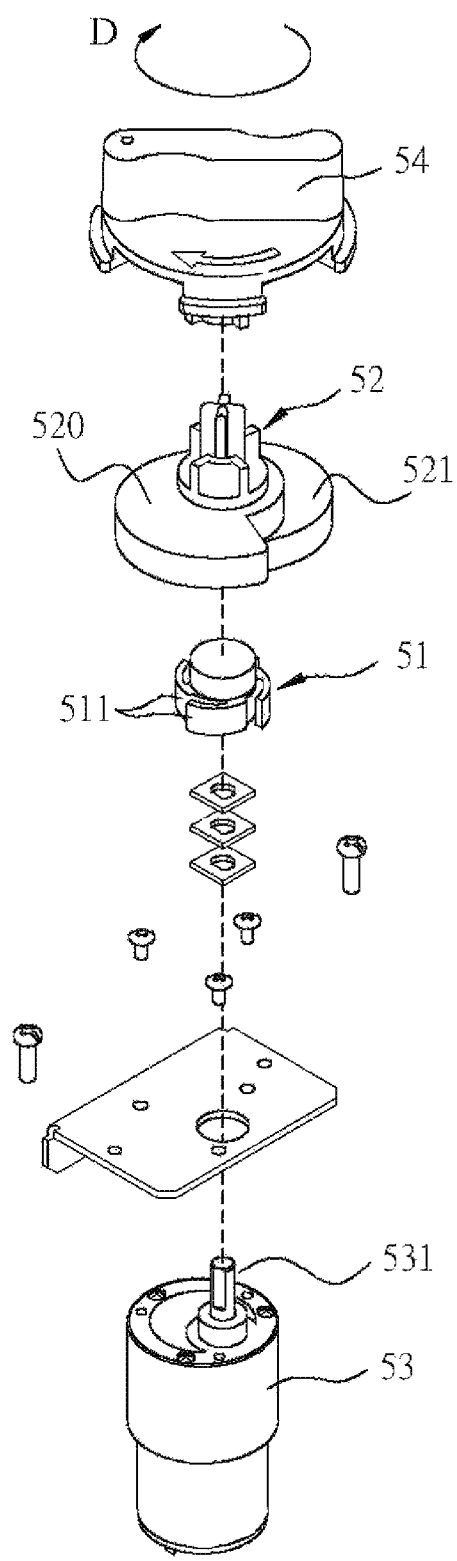
FIG. 5 is a partial, exploded view illustrating the connection between the gear motor, ratchet, cam drive mechanism, and manual transfer handle FIGS. 6 A & 6B perspective views showing MCCB 1 (6A) and MCCB 2 (6B) mounted in their Bases, their Toggle Levers and Fulcrum Points, Rear Crossbars and Opening Springs.

With Reference to FIG. 5 the Cam Drive Mechanism 52 consists of two Snail/drop cams 520, 521, which drive Roller Followers 61, 64 extending from rear crossbars of Toggle Lever 1 63 and Toggle Lever 2 66 respectively. Snail/drop cams 520, 521 are identical in shape and have a lower surface that rises to a peak surface when rotated in the clockwise direction before dropping sharply back to a lower surface. Snail/Drop Cams 520, 521 are installed coaxially but opposite in orientation with the peak surfaces of the two cams 180 degrees out of phase.

The orientation of the peak surfaces of Snail/Drop Cam 1 520 and Snail/Drop Cam 2 521 prevents both Toggle Levers 63, 66 from transmitting a closing input to MCCB 1 41 and MCCB 2 42 at the same time and connecting both Normal power 31 and Standby power source 32 at the same time. The orientation of the peak surface cams also provides both MCCB open positions in the fixed transfer sequence (see FIGS. 7 & 9). The both MCCB open positions are between the Normal power MCCB closed position (FIG. 8) position and the Standby power MCCB closed position (FIG. 9) in the fixed transfer sequence.

Roller follower 61 on the rear crossbar of Toggle Lever 1 63 is in contact with the surface of Snail/drop Cam 1 520 in the Cam Drive Mechanism 52. Roller follower 64 on the rear crossbar of Toggle Lever 2 66 is in contact with the surface of Snail/Drop Cam 2 521 in the Cam Drive Mechanism 52.

With reference to FIG. 5, Cam Drive Mechanism 52 can be rotated manually with a Manual Transfer Handle 54 or automatically by a Motor 53 that is operated by Controller 8.

Motor 53 is a unidirectional gear motor with a Motor Shaft 531 that inserts into Ratchet 51 to rotate the Cam Drive Mechanism 52.

Ratchet 51 is a one-way ratchet with multiple Ratchet gear teeth 511 that engage the Cam Drive Mechanism 52 when turned clockwise by the Motor 53. The arrangement and direction of the Ratchet Gear Teeth 511 declutches the Ratchet 51 from the Motor Shaft 531 when Cam Drive Mechanism 52 is rotated by the Manual Transfer Handle 54. This declutching allows manual operation of the Cam Drive Mechanism 52 without engaging the Gear Motor Shaft 531 and thereby rotating the Gear Motor 53.

Operation

Figure 8:
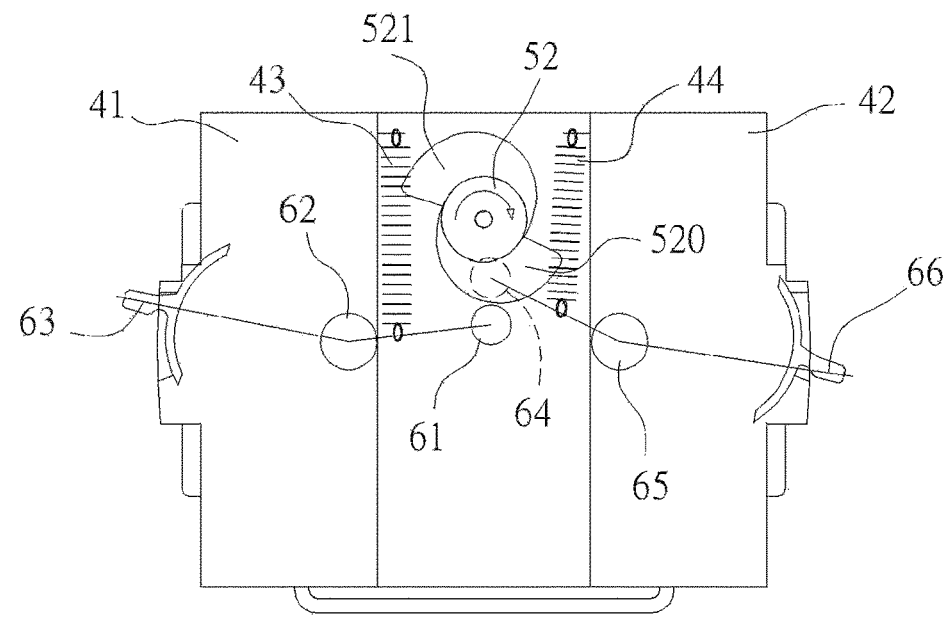
Figure 9:
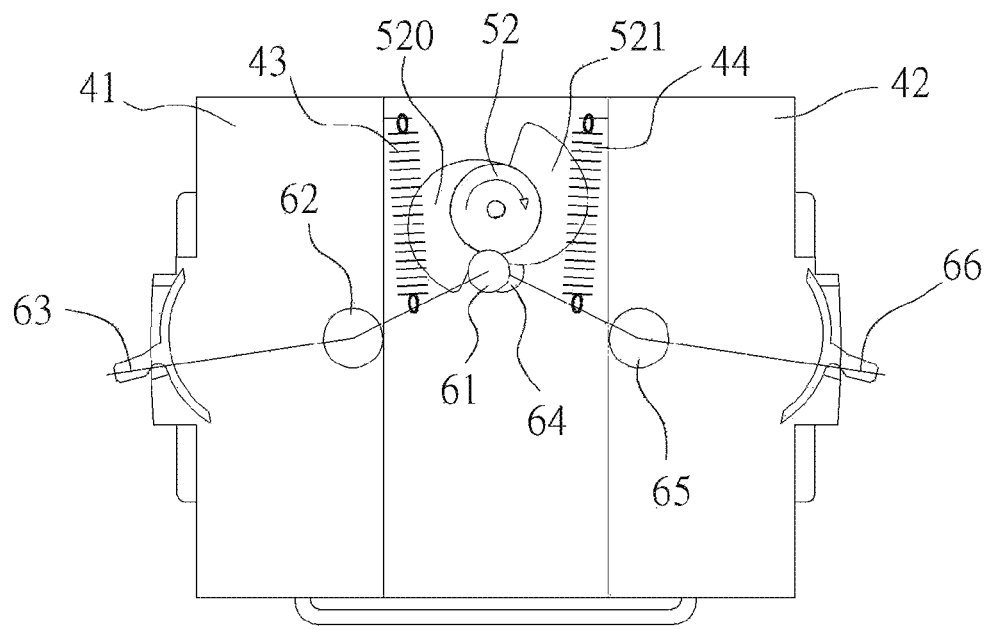
Figure 10:
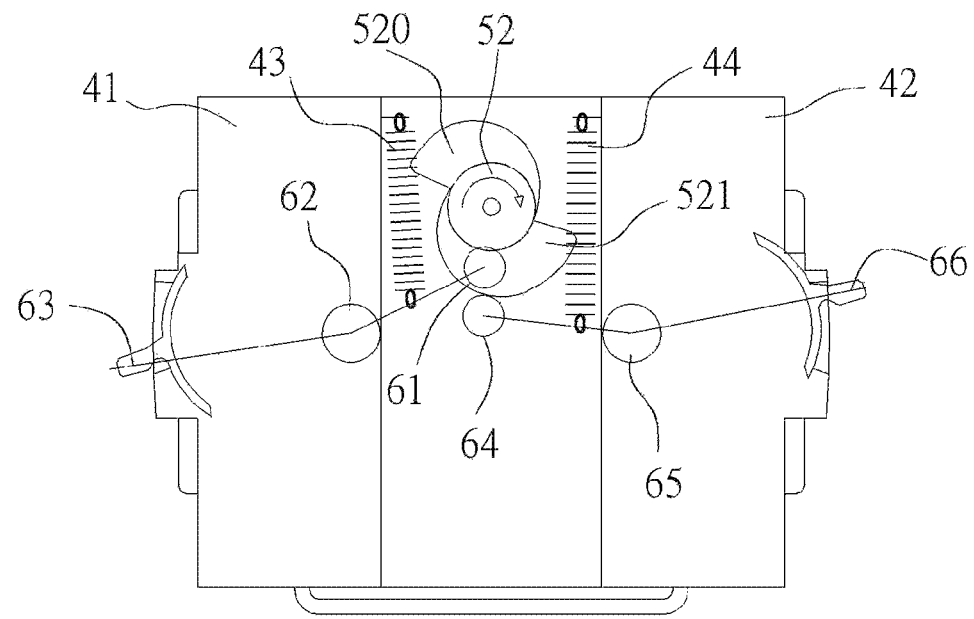

FIGS. 7, 8, 9, and 10 reveal in detail the operation of the Cam Drive Mechanism 52 and the Stored Energy Opening Springs 43, 44 to operate Lever Toggles 63, 66 to open and close MCCB 1 and MCCB 2 through the fixed sequence of four positions:
1) Both MCCBs open position (FIG. 7)
2) Normal power MCCB closed position (FIG. 8)
3) Both MCCBs open position (FIG. 9)
4) Standby power MCCB closed position (FIG. 10)

Further Rotation returns the ATS to Position 1) to repeat this sequence.

Figure 7:
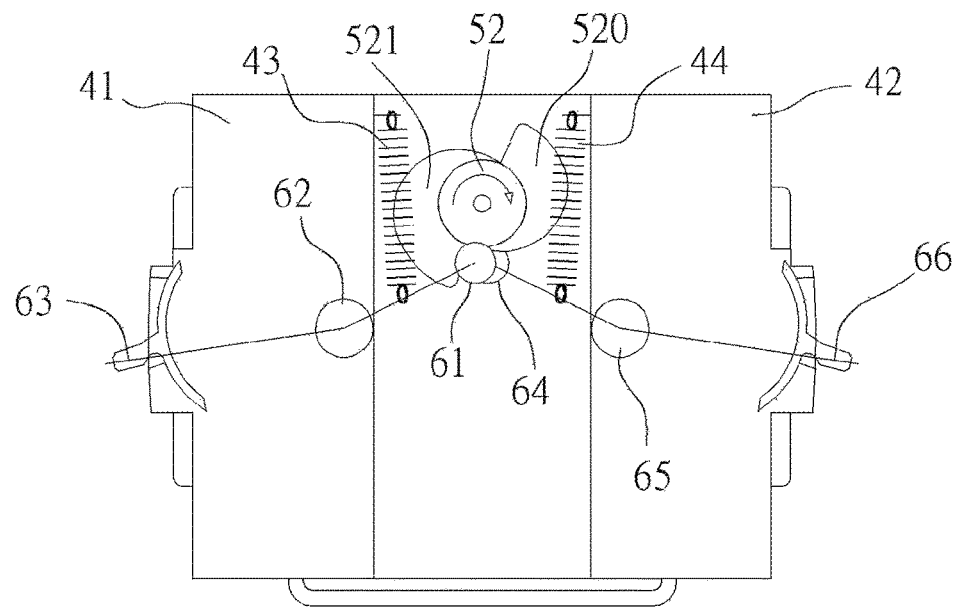
FIGS. 7 to 10 schematic views illustrating operation of the Cam Drive Mechanism and Stored Energy Opening Springs on the toggle levers.

FIG. 7 shows Position 1) Both MCCBs open position

Roller follower 61 on the Rear Crossbar 631 of Toggle Lever 1 rests on the lower surface of Snail/drop Cam 1 520 and no closing force is transmitted through Toggle Lever 1 63. Roller follower 64 on the Rear Crossbar 661 of Toggle Lever 2 66 rests on the lower surface of Snail/drop Cam 2 521 and no closing force is transmitted to Toggle Lever 2 66. Both sets of Stored Energy Opening Springs 43, 44 on Toggle Lever 1 63 and Toggle Lever 2 66 are in a contracted state and both MCCB 1 41 and MCCB 2 42 are open.

FIG. 8 shows Position 2) Normal power MCCB closed position When Cam Drive Mechanism 52 rotates clockwise from Position 1) Roller Follower 61 on the rear crossbar of Toggle Lever 1 63 rotates to the Peak surface of Cam 1 520 raising Rear Crossbar 632 on Toggle Lever 1 providing a closing force to the toggle on MCCB 1 41 through the leverage of Fulcrum points 62.

The Stored Energy Opening Springs 43 on the Rear Crossbar of Toggle Lever 1 63 expand and store energy in this closing process. Roller follower 64 on the Rear Crossbar 661 rotates to a further point on the surface of Cam 2 521 but no closing force is transmitted to Toggle Lever 2 66. Opening springs 44 on rear crossbar of Toggle Lever 2 remain in a contracted state. MCCB 1 41 is closed and MCCB 2 42 is open.

FIG. 9 shows Position 3) both MCCBs open position When Cam Drive mechanism 52 rotates clockwise from the Normal power MCCB closed position Roller Follower 61 on the rear crossbar of Toggle Lever 1 drops sharply to the lower surface of Cam 1 520 removing any closing force through Toggle Lever 1 63. The Stored Energy Opening Springs 43 connected to the Rear Crossbar 631 of Toggle Lever 1 contract releasing stored energy and pulling open MCCB 1 41 through the leverage of Fulcrum points 62. Roller follower 63 on the rear crossbar rotates to a further point on the surface of Snail/Drop Cam 2 521 and no upward force is given to Toggle Lever 2. Stored Energy Opening springs 44 on the rear crossbar of Toggle Lever 2 66 remain in a contracted state. MCCB 1 and MCCB 2 are both open.

FIG. 10 shows Position 4) Standby power MCCB closed position When Cam Drive Mechanism 52 rotates clockwise from the previous both MCCB open position in FIG. 9 Roller Follower 64 on the rear crossbar of Toggle Lever 2 66 rotates to the peak surface of Snail/drop Cam 2 521 raising the rear crossbar of Toggle Lever 2 66 providing a closing force to the toggle on MCCB 2 through the leverage of Fulcrum points 62.

Stored Energy Opening Springs 44 on the Rear Crossbar 661 of Toggle Lever 2 expand to store energy in the closing process. Roller follower 61 on the rear crossbar rotates to a further point on the surface of Snail/Drop Cam 1 520 and no upward force is given to Toggle Lever 1. Stored Energy Opening Springs 43 on rear crossbar of Toggle Lever 1 remain in a contracted state. MCCB 1 41 is open and MCCB 2 42 is closed.

Further rotation of the Cam Drive Mechanism 52 from the Standby power MCCB closed position will return the ATS to the first both MCCB open position in FIG. 7 and this cycle will repeat as the Cam Drive Mechanism 52 is rotates either electrically by the gear motor or manually with the Manual Transfer Handle.

Figure 11:
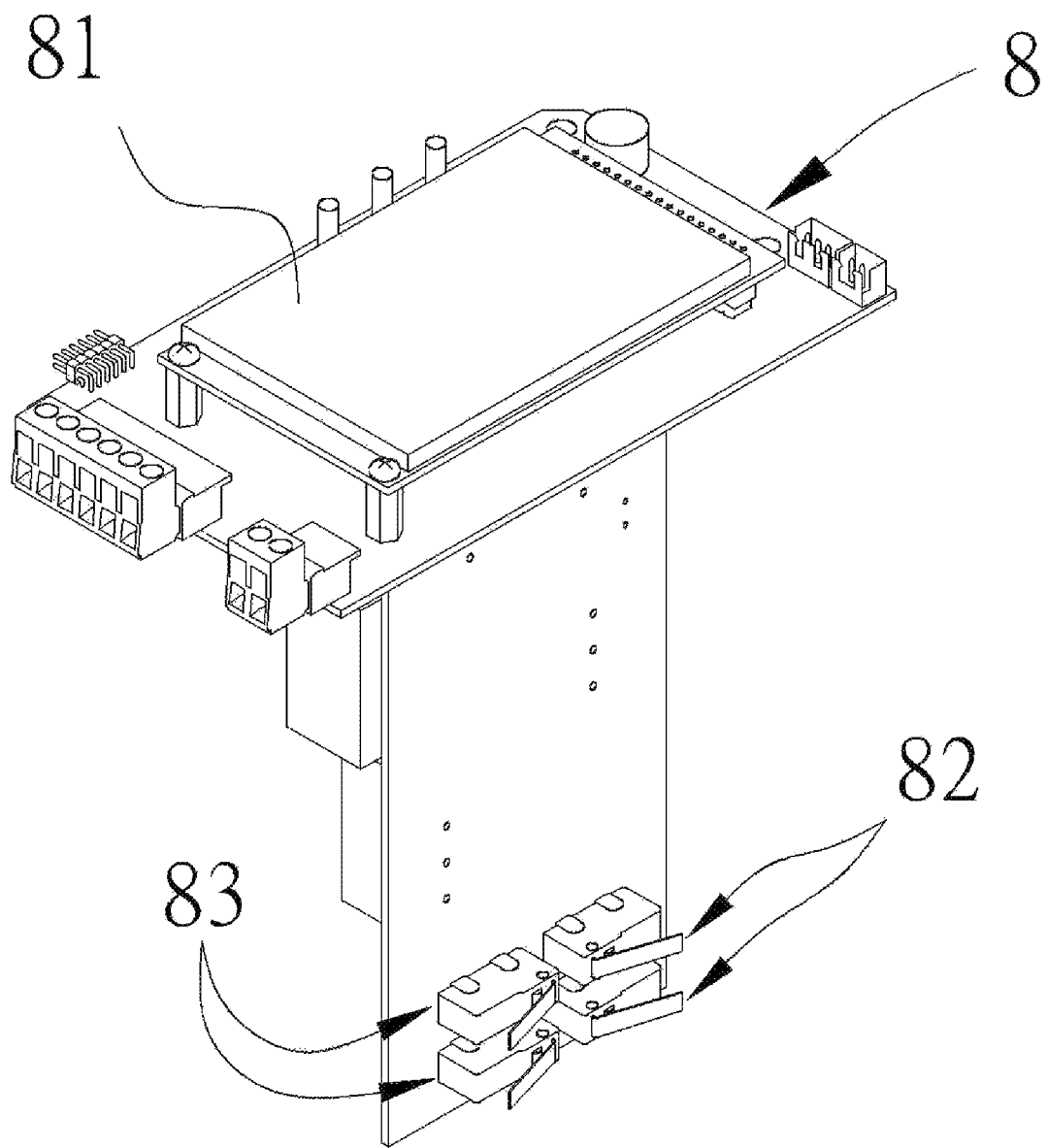
FIG. 11 is a perspective view of the Controller and MCCB position micro switches in the invention.

Referring to FIG. 11, an electronic Controller 8 is integrated with the transfer switch in this embodiment. The Controller 8 monitors the status of Normal Power Source 31 and Standby power source 32, controls the automatic transfer process and provides electric power to the Gear Motor 53. Controller 8 has a Controller Display screen 81 for displaying position of each MCCB and the status of each power source.

Mechanical Interlock

Figure 12:
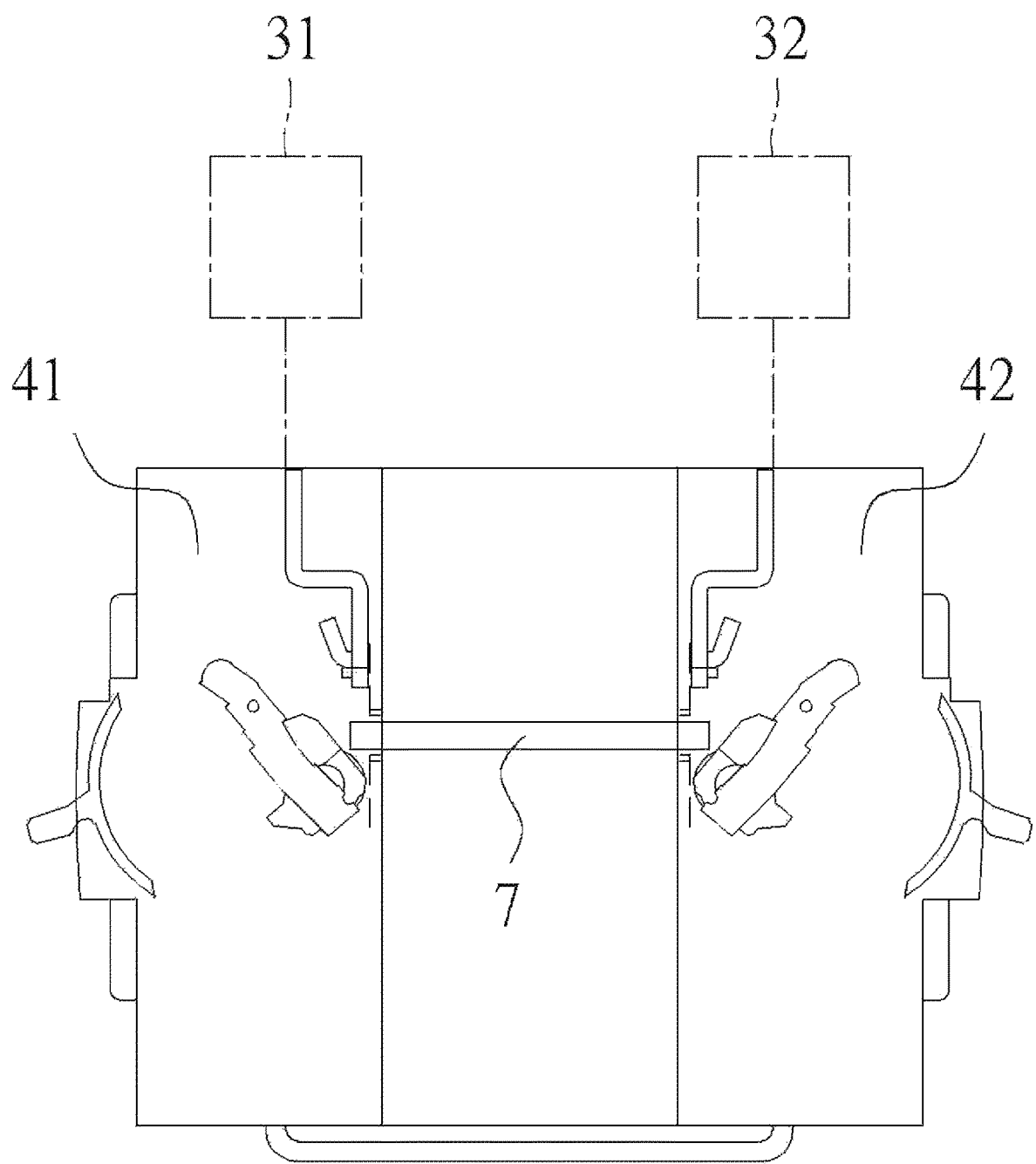
FIGS. 12 to 14 are schematic diagrams illustrating the operation of the Mechanical interlock bar and MCCB 1 and MCCB 2.
Figure 13:
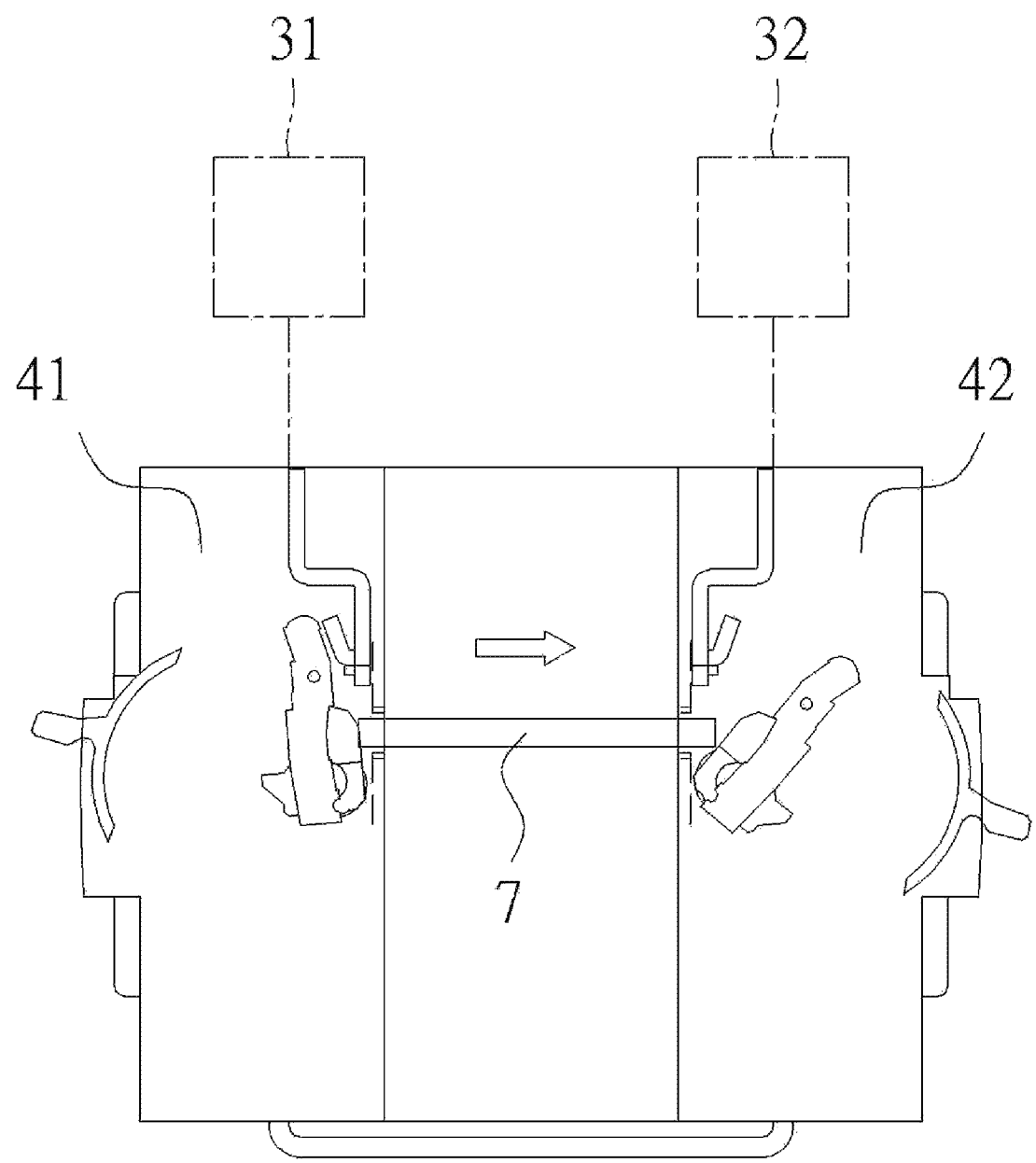
Figure 14:
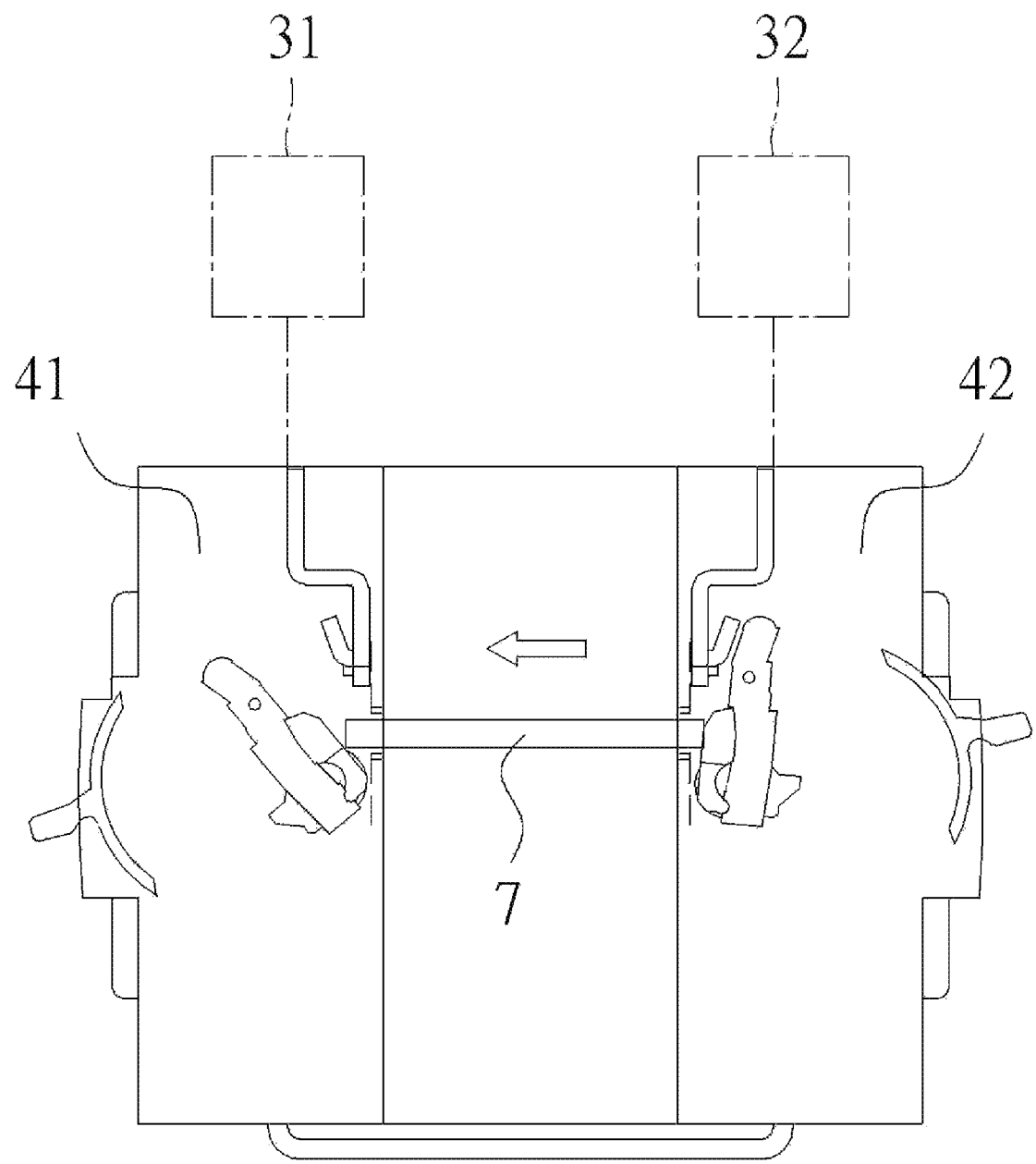

With reference to FIGS. 12, 13, & 14, a Mechanical Interlock Bar 7 made of a non-conductive material inserts into openings on the rear side of each MCCB. Mechanical Interlock Bar 7 is pushed outward by a mechanical element connected to the contacts when an MCCB closes. Mechanical Interlock Bar 7 is pushed outward by a closing MCCB and into the opposite MCCB physically preventing that switch from closing and preventing Normal and Standby power sources from connecting at the same time.

Figure 15:
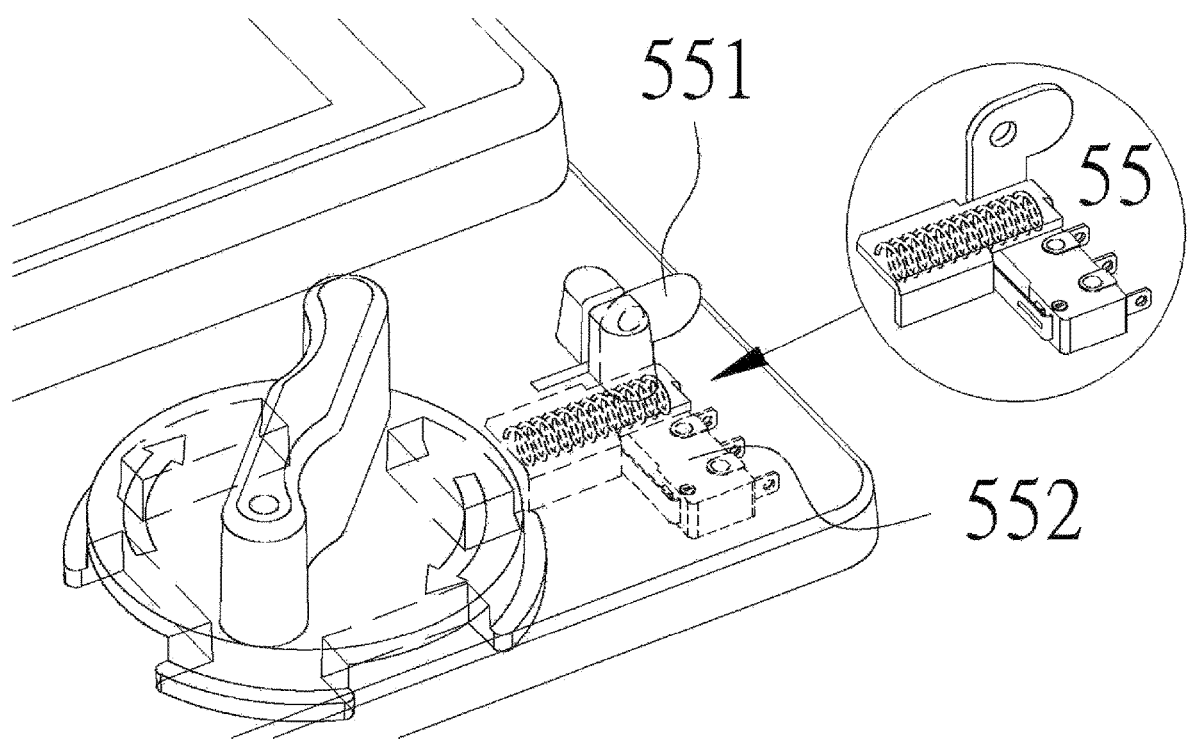
FIGS. 15 & 16, top views illustrating the locking device of this invention.
Figure 16:
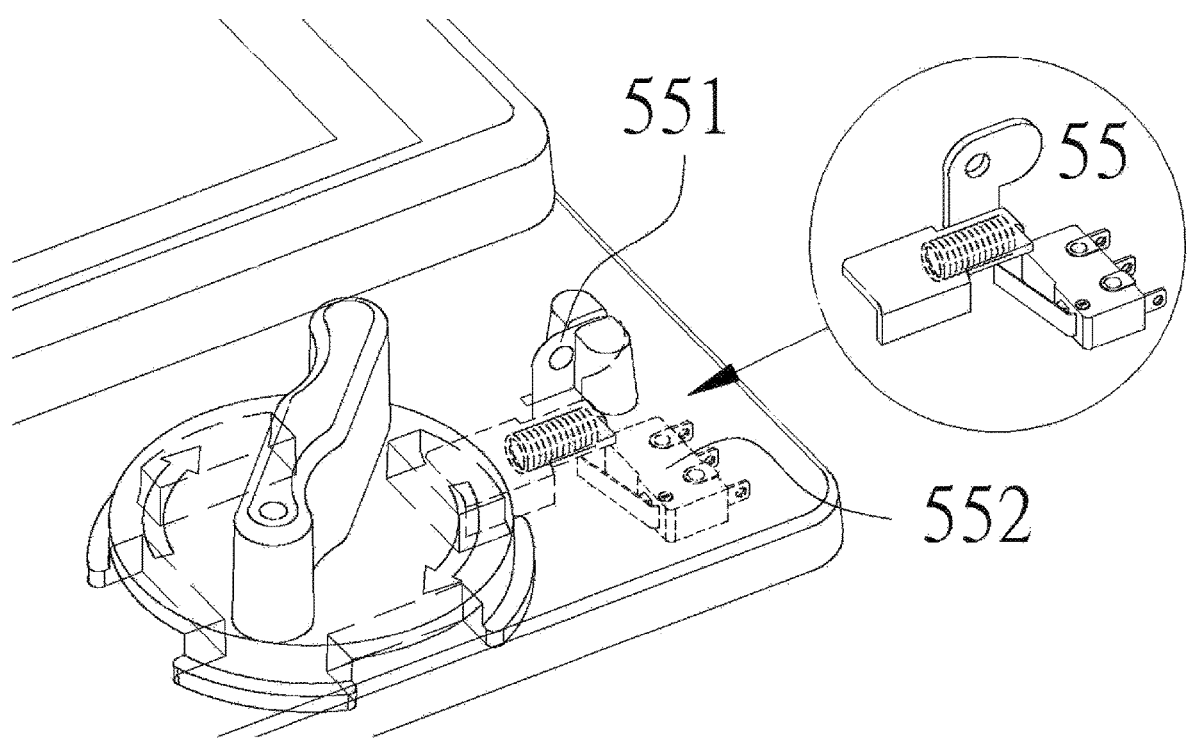

With reference to FIGS. 5, 15 &16, a Manual Transfer Handle 54 manually rotates the Cam Drive Mechanism 52 clockwise direction to open and close MCCB 1 and MCCB 2 in the fixed sequence shown in FIGS. 7, 8, 9, & 10.

Motor Shaft 531 inserts into a Ratchet 51 to transmit rotating force to Cam Drive Mechanism 52. The orientation of Ratchet Teeth 511 allows the Manual Transfer Handle 54 to rotate the Cam Drive Mechanism 52 without engaging Motor Shaft 531. When Cam Drive Mechanism 52 is rotated by Manual Transfer Handle 54 the direction of the Ratchet Teeth 511 causes the Ratchet 51 to declutch from the Motor Shaft 531 preventing manual rotation of the Gear Motor 53.

With Reference to FIGS. 15 & 16, a Locking Device 55 prevents any changes from any position by either manual or automatic operation. Locking Device 55 can lock the ATS in any of the four positions in the fixed transfer sequence (see FIGS. 7, 8, 9, and 10)

Locking Device 55 consists of a Locking Clip 551 to block rotation of the Manual Transfer Handle 54. Pushing in the Locking Clip 551 compresses a spring mechanism that pushes the clip outward. Locking Clip 551 has a hole to attach a padlock to block the return of the clip by two studs extending from the Front Cover 5 of the ATS.

Pushing Locking Clip 551 inward opens a Locked Position Micro Switch 552 to signal the Controller 8 that the switch is locked and prevent automatic operation. The opening of Locked Position Micro Switch 552 will cause Controller 8 to remove power to the Gear Motor 53 and ignore any inputs through buttons on the Controller 8.

When the padlock is removed or Locking Clip 551 is released the compressed spring mechanism expands pushing Locking Clip 551 outward, unblocking the Manual Transfer Handle 54. The Locked Position Micro Switch 552 closes in this process enabling power to the Gear Motor 53 and inputs to Controller 8 for automatic operation of the ATS.

Figure 17:
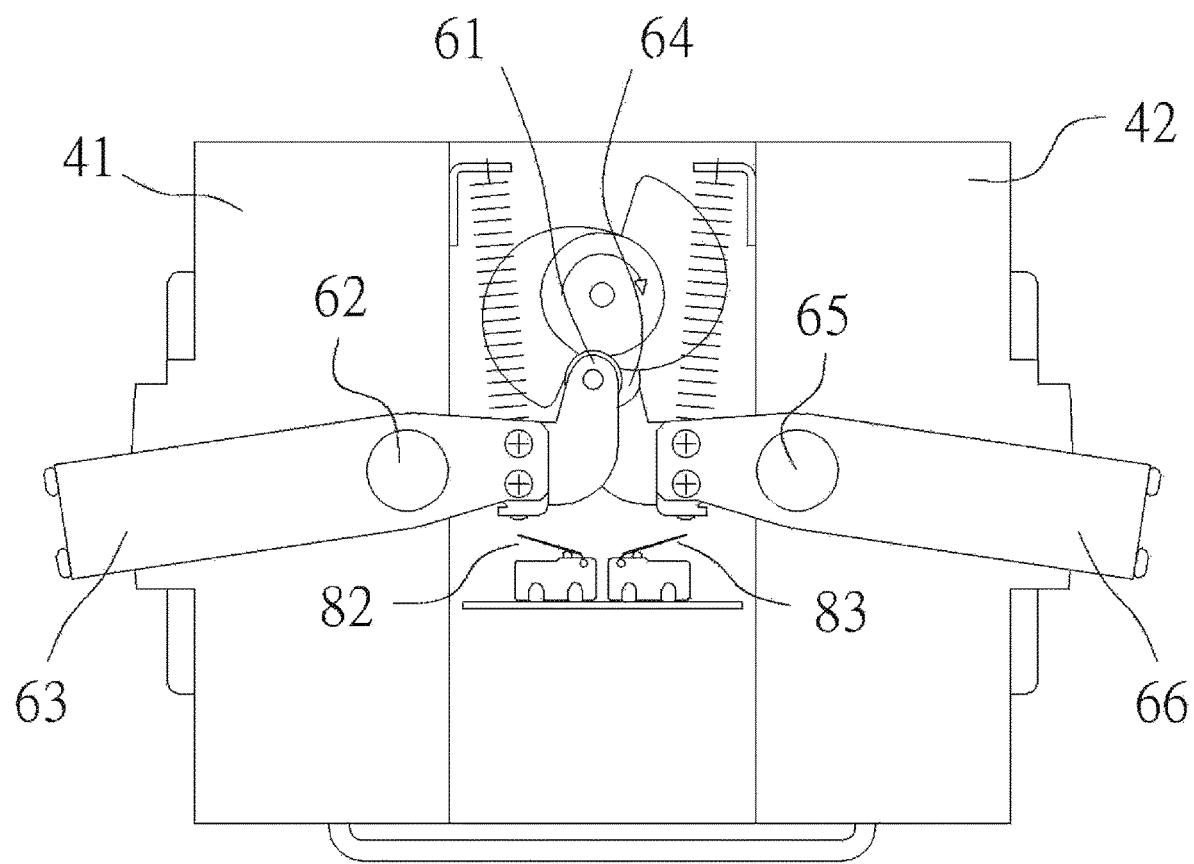
FIGS. 17 & 18 are schematic views showing operation of the Toggle Levers closing MCCB position Micro Switches
Figure 18:
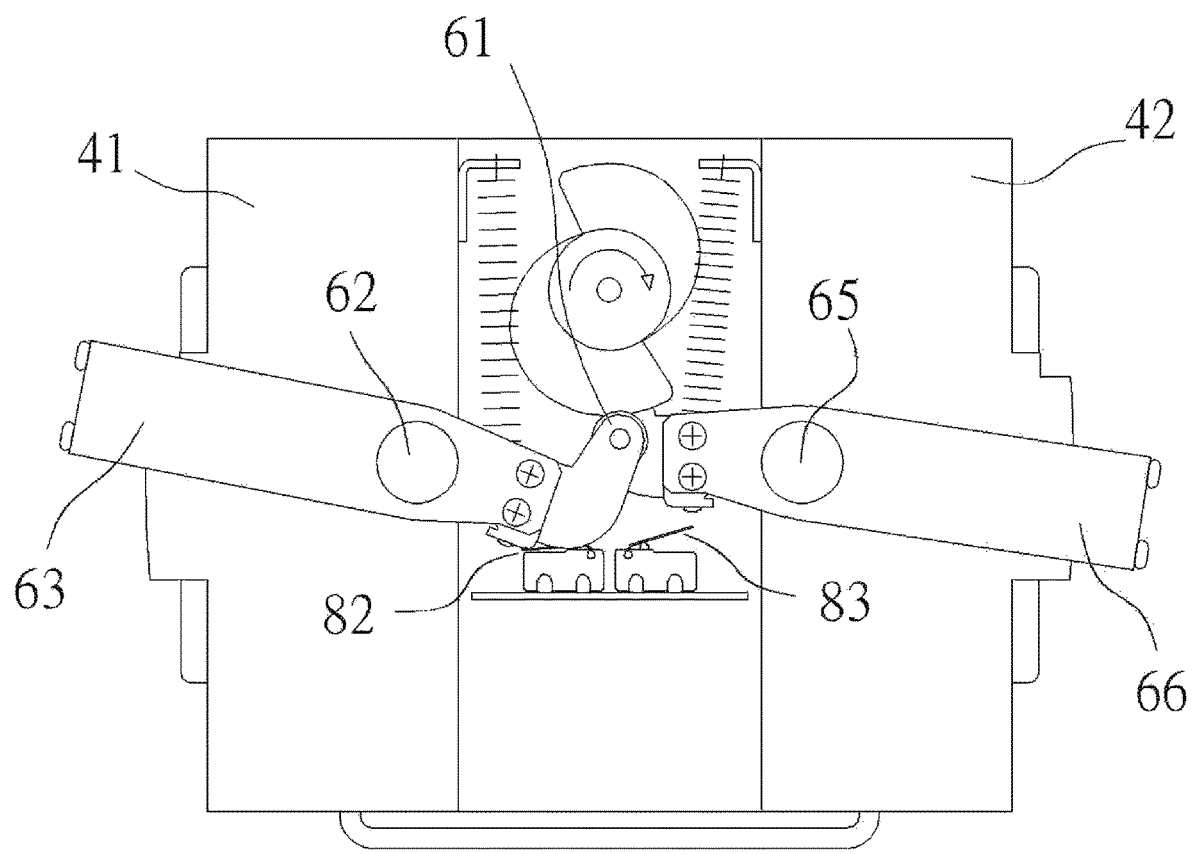

With reference to FIGS. 11, 17 & 18, a pair of MCCB Position Micro switches 82 are associated with MCCB 1 41. A second pair of MCCB Position micro switches 83 are associated with MCCB 2 42. These micro switches are located on Controller 8 to detect the open or closed position of each MCCB respectively. Controller 8 has a Display screen 81 for displaying position of each MCCB and the status of each Normal power source 31 and Standby Power Source 32.

One micro switch in each pair 82, 83 provides MCCB position information to Controller 8. The other micro switch in each pair provides an auxiliary output of MCCB position for use by external devices.

Both pairs of MCCB Position Micro switches 82, 83 are normally open and provide a closed signal when compressed by the rear crossbar of Toggle Lever 1 63 or Toggle Lever 2 66 as shown in FIGS. 17 & 18.

FIG. 17 shows ATS in a both MCCB open position.

FIG. 18 shows the MCCB 1 41 closed position. The rear crossbar Toggle Lever 1 63 closes MCCB Position Micro Switches 82. Toggle Lever 2 remains in the open position and MCCB Position Micro Switches 83 remain open.

LIST OF REFERENCE NUMERALS

1 . . . prior art ATS (side-by-side mounting of MCCB)
11 . . . Bi-directional Motor Shaft (prior art)
12 . . . Bi-directional Toggle lever (prior art)
13 . . . Normal Power MCCB (prior art)
14 . . . Standby Power MCCB (prior art)
15 . . . Bus bar (prior art)
16 . . . Bus bar (prior art)
21 . . . Normal Power source (prior art)
22 . . . Standby Power source (prior art)
31 . . . Normal Power source
32 . . . Standby Power source
41 . . . MCCB 1 (Normal Power MCCB)
42 . . . MCCB 2 (Standby Power MCCB)
43 . . . Stored Energy Opening Springs for Toggle Lever 1
44 . . . Stored Energy Opening Springs for Toggle Lever 2
45 . . . Bus bars connecting load sides of MCCB 1 and MCCB 2
46 . . . Lugs connecting ATS to Normal power source
47 . . . Lugs connecting ATS to Standby power source
48 . . . Lugs connecting bus bars to load
5 . . . Front Cover of ATS
51 . . . Ratchet
511 . . . Ratchet gear teeth
52 . . . Cam Drive Mechanism
520 . . . Snail/drop Cam 1
521 . . . Snail/drop Cam 2
53 . . . Motor
531 . . . Gear Motor shaft
54 . . . Manual Transfer Handle
55 . . . Locking Device
551 . . . Locking Clip
552 . . . Locked Position Micro Switch
61 . . . Roller follower on Toggle Lever 1
62 . . . Fulcrum points for Toggle Lever 1
63 . . . Toggle Lever 1
631 . . . Rear Crossbar of Toggle Lever 1
64 . . . Roller Follower of Toggle Lever 2
65 . . . Fulcrum points for Toggle Lever 2
66 . . . Toggle Lever 2
661 . . . Rear Crossbar of Toggle Lever 2
7 . . . Mechanical Interlock Bar
70 . . . Mounting Base for MCCB 1
71 . . . Mounting Base for MCCB 2
75 . . . Mounting Base Plate for MCCB Bases
8 . . . Controller
81 . . . Controller Display Screen
82 . . . Position Micro switches for MCCB 1

83 . . . Position Micro switches for MCCB 2
D Direction of rotation of cam mechanism

What is claimed is:

1. An automatic transfer switch (ATS) utilizing molded case circuit breakers (MCCB) or molded case switches (MCS) to connect and disconnect an electrical load to a Normal power source and a Standby power source, said ATS comprising:
    two molded case circuit breakers (MCCB) or molded case switches (MCS) mounted back-to-back to connect a load to a Normal power source and a Standby power source;
    bus bars electrically connecting the poles on the load side of the MCCB or MCS connecting the ATS to a load;
    a rotating cam drive mechanism driving toggle levers with attached stored energy opening springs to toggle open and closed the MCCB or MCS through the leverage of fulcrum points;
    a ratchet mounted on the output shaft of a unidirectional gear motor to rotate the cam drive mechanism and declutch from the motor shaft when the cam drive mechanism is manually operated;
    a fixed length non-conducting interlock bar located between movable elements of each MCS or MCCB to prohibit the opposite switch from closing at the same time; and
    a safety lock that blocks operation of the cam drive by manual transfer handle and also signals an ATS controller to disconnect electric power to a gear motor.

* * * * *